(12) United States Patent
Ramaswamy et al.

(10) Patent No.: US 10,474,620 B2
(45) Date of Patent: Nov. 12, 2019

(54) SYSTEM AND METHOD FOR IMPROVING PERIPHERAL COMPONENT INTERFACE EXPRESS BUS PERFORMANCE IN AN INFORMATION HANDLING SYSTEM

(71) Applicant: DELL PRODUCTS, L.P., Round Rock, TX (US)

(72) Inventors: Srikrishna Ramaswamy, Austin, TX (US); Shyamkumar T. Iyer, Austin, TX (US); Duk M. Kim, Cedar Park, TX (US)

(73) Assignee: Dell Products, L.P., Round Rock, TX (US)

( * ) Notice: Subject to any disclaimer, the term of this patent is extended or adjusted under 35 U.S.C. 154(b) by 298 days.

(21) Appl. No.: 15/397,003

(22) Filed: Jan. 3, 2017

(65) Prior Publication Data

US 2018/0189225 A1   Jul. 5, 2018

(51) Int. Cl.
*G06F 13/42* (2006.01)
*G06F 13/40* (2006.01)
*G06F 13/16* (2006.01)

(52) U.S. Cl.
CPC ...... *G06F 13/4282* (2013.01); *G06F 13/1631* (2013.01); *G06F 13/4022* (2013.01); *G06F 2213/0026* (2013.01)

(58) Field of Classification Search
CPC ............. G06F 13/1631; G06F 13/4022; G06F 13/4282; G06F 2213/0026
See application file for complete search history.

(56) References Cited

U.S. PATENT DOCUMENTS

| | | | | |
|---|---|---|---|---|
| 7,526,593 | B2 * | 4/2009 | Mandal | G06F 13/404 710/310 |
| 9,274,901 | B2 * | 3/2016 | Veerla | G06F 11/167 |
| 2016/0210258 | A1 | 7/2016 | Shen | |
| 2016/0371222 | A1 | 12/2016 | Yifrach et al. | |

* cited by examiner

*Primary Examiner* — Idriss N Alrobaye
*Assistant Examiner* — Richard B Franklin
(74) *Attorney, Agent, or Firm* — Isidore PLLC

(57) ABSTRACT

An information handling system (IHS) and a method of transmitting data in an IHS. The method includes detecting, via a hardware logic device, a first memory transaction request from a first peripheral component interconnect express (PCIe) device to a system memory. The first memory transaction request includes a first system memory address. A second memory transaction request is detected from a second PCIe device to the system memory. The second memory transaction request includes a second system memory address. The method further includes determining if the first system memory address and the second system memory address are the same system memory address. In response to the first and second system memory addresses being the same, the first memory transaction request and the second memory transaction request are coalesced into a common memory transaction request. The common memory transaction request is issued to the system memory.

20 Claims, 10 Drawing Sheets

SYSTEM AND METHOD FOR IMPROVING PERIPHERAL COMPONENT INTERFACE EXPRESS BUS PERFORMANCE IN AN INFORMATION HANDLING SYSTEM

BACKGROUND

1. Technical Field

The present disclosure generally relates to information handling systems and in particular to a system and method for improving peripheral component interface express bus performance in an information handling system.

2. Description of the Related Art

As the value and use of information continue to increase, individuals and businesses seek additional ways to process and store information. One option available to users is information handling systems. An information handling system generally processes, compiles, stores, and/or communicates information or data for business, personal or other purposes, thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Peripheral component interconnect express (PCIe) is a local serial expansion bus for attaching hardware devices in an information handling system. The attached hardware devices can be a wide variety of devices, including, but not limited to, co-processors, graphic processing units (GPUs) and storage devices, such as solid state storage devices (SSD). The PCIe bus supports the functions found on a processor bus, but in a standardized format that is independent of any particular processor's native bus. PCIe is based on point-to-point topology, with separate serial links connecting every device to the host. A PCIe bus link supports full-duplex communication between any two endpoints, with no inherent limitation on concurrent access across multiple endpoints. PCIe communications are encapsulated in packets. The work of packetizing and de-packetizing data and status-message traffic is handled by the transaction layer of the PCIe port.

One problem with current information handling systems is that the PCIe bus includes several PCIe endpoints that can utilize and/or manipulate data from the same physical/machine memory address. A duplication of upstream and downstream transactions can occur, resulting in increased data transmission times and latency. The duplication of transactions reduces the PCIe bandwidth capacity and increases system latency.

BRIEF SUMMARY

Disclosed is an information handling system (IHS) and a method of transmitting data to and from PCIe devices in an IHS.

According to one embodiment, a method of transmitting data in an IHS is disclosed. The method includes detecting, via a hardware logic device, a first memory transaction request from a first peripheral component interconnect express (PCIe) device to a system memory. The first memory transaction request includes a first system memory address. A second memory transaction request is detected from a second PCIe device to the system memory. The second memory transaction request includes a second system memory address. The method further includes determining if the first system memory address and the second system memory address are the same system memory address. In response to the first system memory address and the second system memory address being the same system memory address, the first memory transaction request and the second memory transaction request are coalesced into a common memory transaction request. The common memory transaction request is issued to the system memory.

Also disclosed is an IHS that includes (i) a processor that is communicatively coupled to a system memory and (ii) a hardware logic device that is communicatively coupled to the processor. A first PCIe device is communicatively coupled to the hardware logic device and a second PCIe device is communicatively coupled to the hardware logic device. The hardware logic device has control logic thereon that enables and supports data transmission. The control logic causes the hardware logic device to detect a first memory transaction request from the first PCIe device to the system memory. The first memory transaction request includes a first system memory address. The hardware logic device detects a second memory transaction request from the second PCIe device to the system memory device. The second memory transaction request includes a second system memory address. The hardware logic device determines if the first system memory address and the second system memory address are the same system memory address. In response to the first system memory address and the second system memory address being the same system memory address, the hardware logic device coalesces the first memory transaction request and the second memory transaction request into a common memory transaction request. The hardware logic device issues the common memory transaction request to the system memory.

According to an additional embodiment, a method of transmitting data using a hardware logic device in an IHS is disclosed. The method includes detecting a first PCIe transaction request issued from the IHS to a first PCIe device. After detecting the first PCIe transaction request, a second PCIe transaction request is also generated by the hardware logic device for a second PCIe device. The second PCIe transaction request is a duplicate of the first PCIe transaction request. The first PCIe transaction request is issued to the first PCIe device and the second PCIe transaction request is issued to the second PCIe device.

Further disclosed is an IHS that includes a processor that is communicatively coupled to a system memory and a hardware logic device that is communicatively coupled to the processor. A first PCIe device is communicatively coupled to the hardware logic device and a second PCIe device is communicatively coupled to the hardware logic device. The hardware logic device includes control logic thereon that causes the hardware logic device to detect a first PCIe transaction request issued from the IHS to a first PCIe device. After detecting the first PCIe transaction request, the hardware logic device generates a second PCIe transaction request for a second PCIe device. The second PCIe transaction request is a duplicate of the first PCIe transaction request. The hardware logic device issues the first PCIe transaction request to the first PCIe device and issues the second PCIe transaction request to the second PCIe device.

The above summary contains simplifications, generalizations and omissions of detail and is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

The illustrative embodiments provide an information handling system (IHS) and a method of transmitting data to and from PCIe devices in an IHS.

In the following detailed description of exemplary embodiments of the disclosure, specific exemplary embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that terms is utilized.

Figure 1:
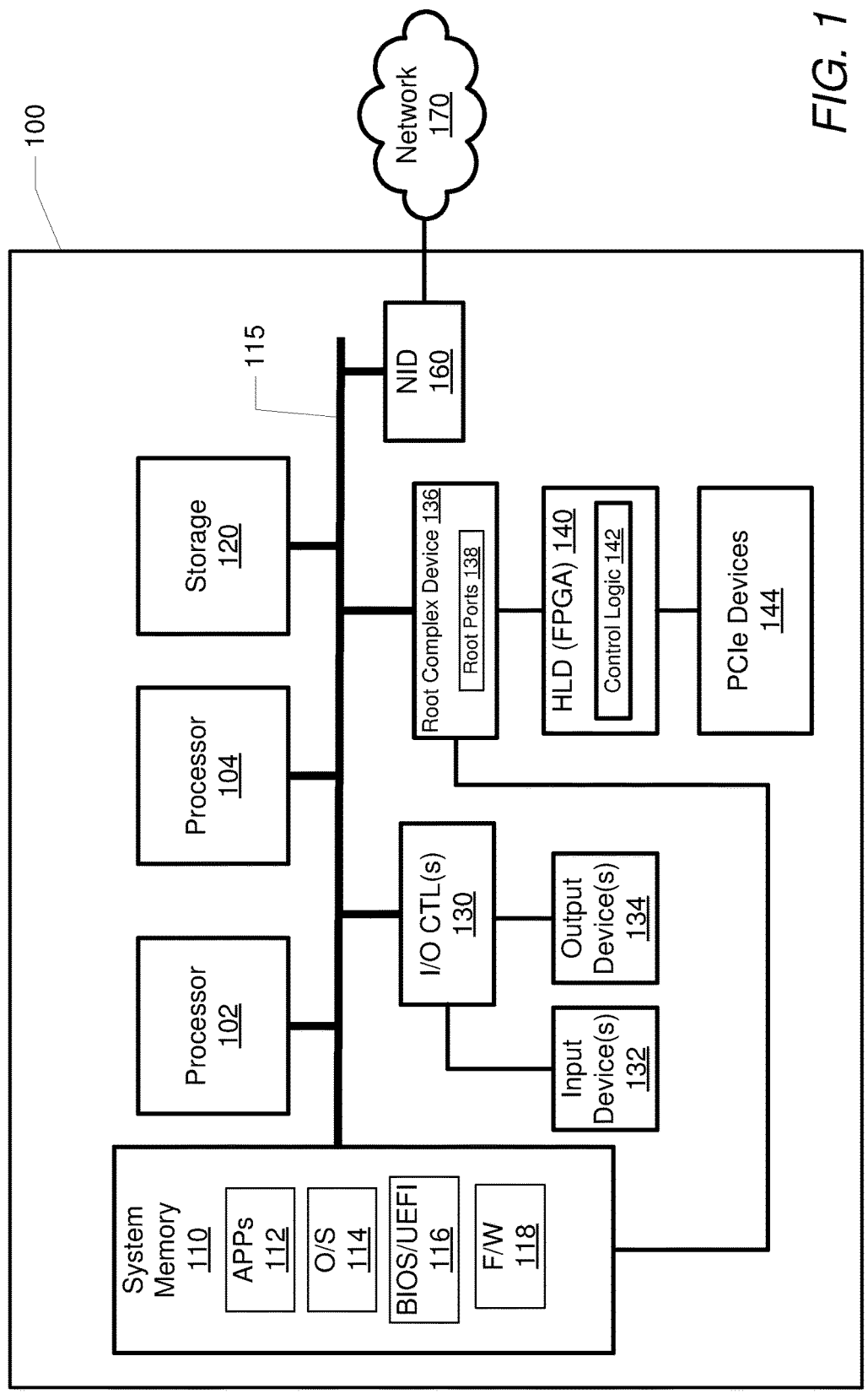
FIG. 1 illustrates an example information handling system within which various aspects of the disclosure can be implemented, according to one or more embodiments.

FIG. 1 illustrates a block diagram representation of an example information handling system (IHS) 100, within which one or more of the described features of the various embodiments of the disclosure can be implemented. For purposes of this disclosure, an information handling system, such as IHS 100, may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a handheld device, personal computer, a server, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Referring specifically to FIG. 1, example IHS 100 includes one or more processors, such as processor 102 and 104. Processors 102 and 104 are coupled to system memory 110 via system interconnect 115. System interconnect 115 can be interchangeably referred to as a system bus, in one or more embodiments. Also coupled to system interconnect 115 is storage 120 within which can be stored one or more software and/or firmware modules and/or data (not specifically shown). In one embodiment, storage 120 can be a hard drive or a solid state drive. The one or more software and/or firmware modules within storage 120 can be loaded into system memory 110 during operation of IHS 100. As shown, system memory 110 can include therein a plurality of software and/or firmware modules including application(s) 112, operating system (O/S) 114, basic input output system/unified extensible firmware interface (BIOS/UEFI) 116 and firmware (F/W) 118. In one or more embodiments, BIOS/UEFI 116 comprises the additional functionality associated with UEFI and can include UEFI images and drivers. The various software and/or firmware modules have varying functionality when their corresponding program code is executed by processors 102 and/or 104 or other processing devices within IHS 100.

IHS 100 further includes one or more input/output (I/O) controllers 130 which support connection by, and processing of signals from, one or more connected input device(s) 132, such as a keyboard, mouse, touch screen, or microphone. I/O controllers 130 also support connection to and forwarding of output signals to one or more connected output devices 134, such as a monitor or display device or audio speaker(s).

IHS 100 further includes a root complex device 136 which is coupled to system interconnect 115 and system memory 110. IHS 100 further includes a field programmable gate array (FPGA) 140, which represents one embodiment of hardware logic device (HLD), and is hereafter utilized as the specific example of hardware logic device. Root complex device 136 is also coupled to hardware logic device, FPGA 140. While presented as an FPGA, in the illustrative embodiments, in another embodiment, the hardware logic device is an application specific integrated circuit (ASIC). Other types of integrated circuits (IC) can also be implemented as the hardware logic device, in other embodiments. Root complex device 136 has several root ports 138. Root complex device 136 connects the processor 102 and system memory 110 to a PCIe fabric. Root complex device 136 can support several PCIe root ports 138. The root ports are connected to an endpoint device via FPGA 140. Root complex device 136 generates transaction requests for processor 102 and transmits packets from root ports 138 and also receives packets to root ports 138. The received packets are then forwarded to system memory 110 or processor 102.

FPGA 140 supports connection to and processing of signals from one or more connected PCIe device(s) 144. FPGA 140 includes hardware logic 142 that can perform one of more of the methods described herein. In one embodiment, PCIe device(s) 144 can include graphic processing units and storage devices, such as solid state drives, including nonvolatile memory express (NVMe) devices. FPGA 140 is coupled to root complex device 136. FPGA 140 supports transmission of data to and from PCI devices 144.

IHS 100 further comprises a network interface device (NID) 160. NID 160 enables IHS 100 to communicate and/or interface with other devices, services, and components that are located external to IHS 100. These devices, services, and components can interface with IHS 100 via an external network, such as example network 170, using one or more communication protocols. In one embodiment, a customer provisioned system/platform can comprise multiple devices located across a distributed network, and NID 160 enables IHS 100 to be connected to these other devices. Network 170 can be a local area network, wide area network, personal area network, and the like, and the connection to and/or between network 170 and IHS 100 can be wired or wireless or a combination thereof. For purposes of discussion, network 170 is indicated as a single collective component for simplicity. However, it is appreciated that network 170 can comprise one or more direct connections to other devices as well as a more complex set of interconnections as can exist within a wide area network, such as the Internet.

Figure 2:
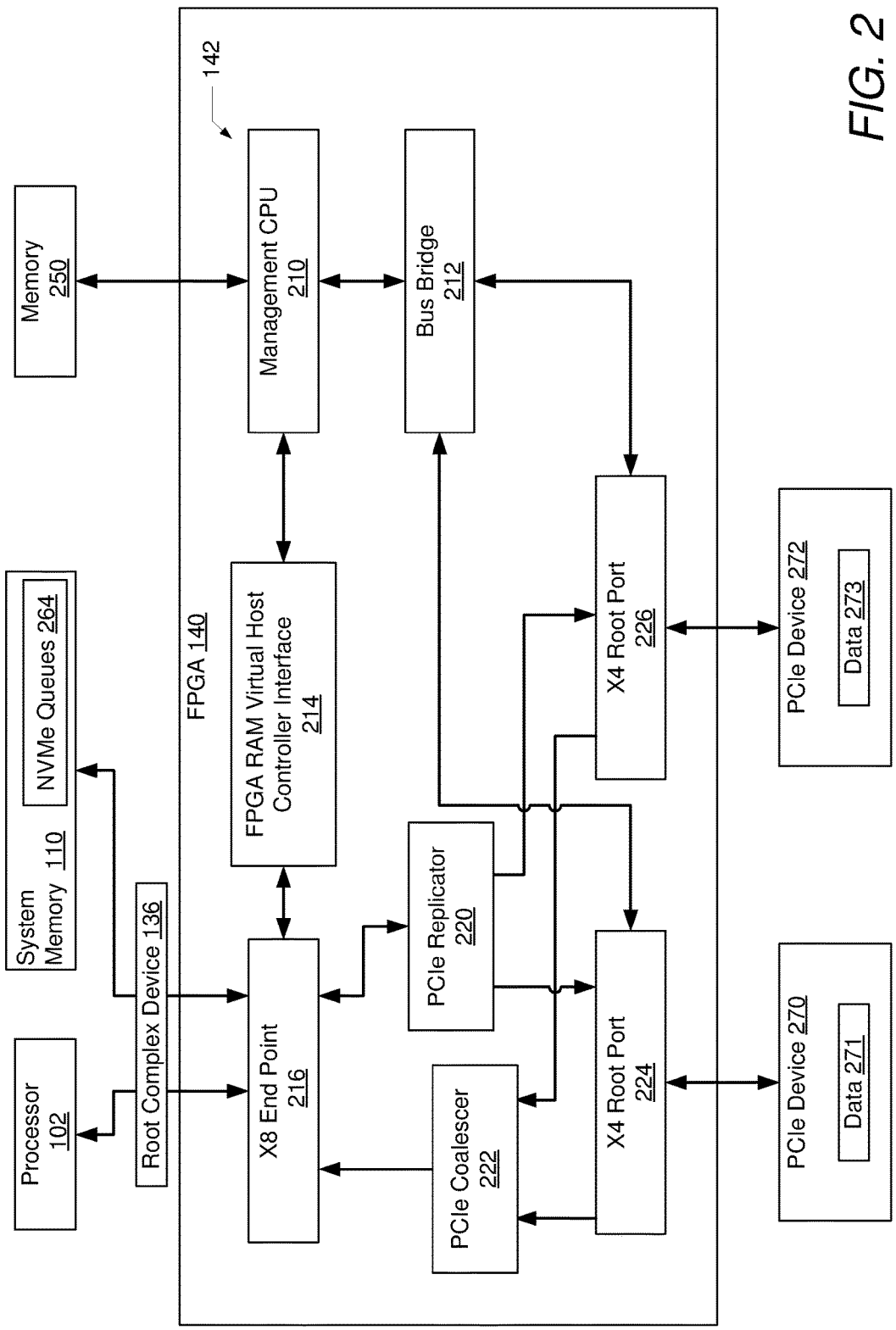
FIG. 2 illustrates an example block diagram of a hardware logic device such as a field programmable gate array (FPGA), according to one or more embodiments.

Referring to FIG. 2, one embodiment of FPGA 140 is shown. FPGA 140 comprises control logic 142 that includes a management central processing unit (CPU) 210 that is communicatively coupled to a bus bridge 212 and a FPGA random access memory (RAM) virtual host controller interface 214. Management CPU 210 is used to enumerate and manage address mappings for PCIe (downstream) end points. FPGA RAM virtual host controller interface 214 is communicatively coupled to a host virtual end point 216. Management CPU 210 is further coupled to an external memory 250. Host virtual end point 216 is coupled to root complex device 136, which is coupled to processor 102 and system memory 110. In one embodiment, system memory 110 can store NVMe queues 264. Host virtual end point 216 is a pseudo endpoint for processor 102. Host virtual end point 216 is further coupled to a PCIe transaction replicator 220 and a PCIe transaction coalescer 222.

PCIe transaction replicator 220 is coupled to root ports 224 and 226. PCIe transaction coalescer 222 is also coupled to root ports 224 and 226. Each of root port 224 and 226 is further coupled to bus bridge 212. Root port 224 is also coupled to PCIe device 270, and root port 226 is also coupled to PCIe device 272. During data transmission between processor 102 and PCIe devices 270 and 272, PCIe transaction replicator 220 and PCIe transaction coalescer 222 function to achieve wire level coalescing and replication of PCIe transactions upstream (to processor 102) and downstream (to PCIe devices 270 and 272), respectively. PCIe device 270 contains data 271 and PCIe device 272 contains data 273. In one embodiment, data 271 and data 273 are substantially the same data (i.e. duplicated). PCIe device 270 and PCIe device 272 can share substantially similar data. In another embodiment, PCIe device 270 and PCIe device 272 can contain data 271 and data 273 that are not duplicated. In one embodiment, PCIe devices 270 and 272 can be NVMe devices that are used in a redundant array of independent drives (RAID) configuration such that all of the data in PCIe device 270 is substantially duplicated in PCIe device 272.

Figure 3:
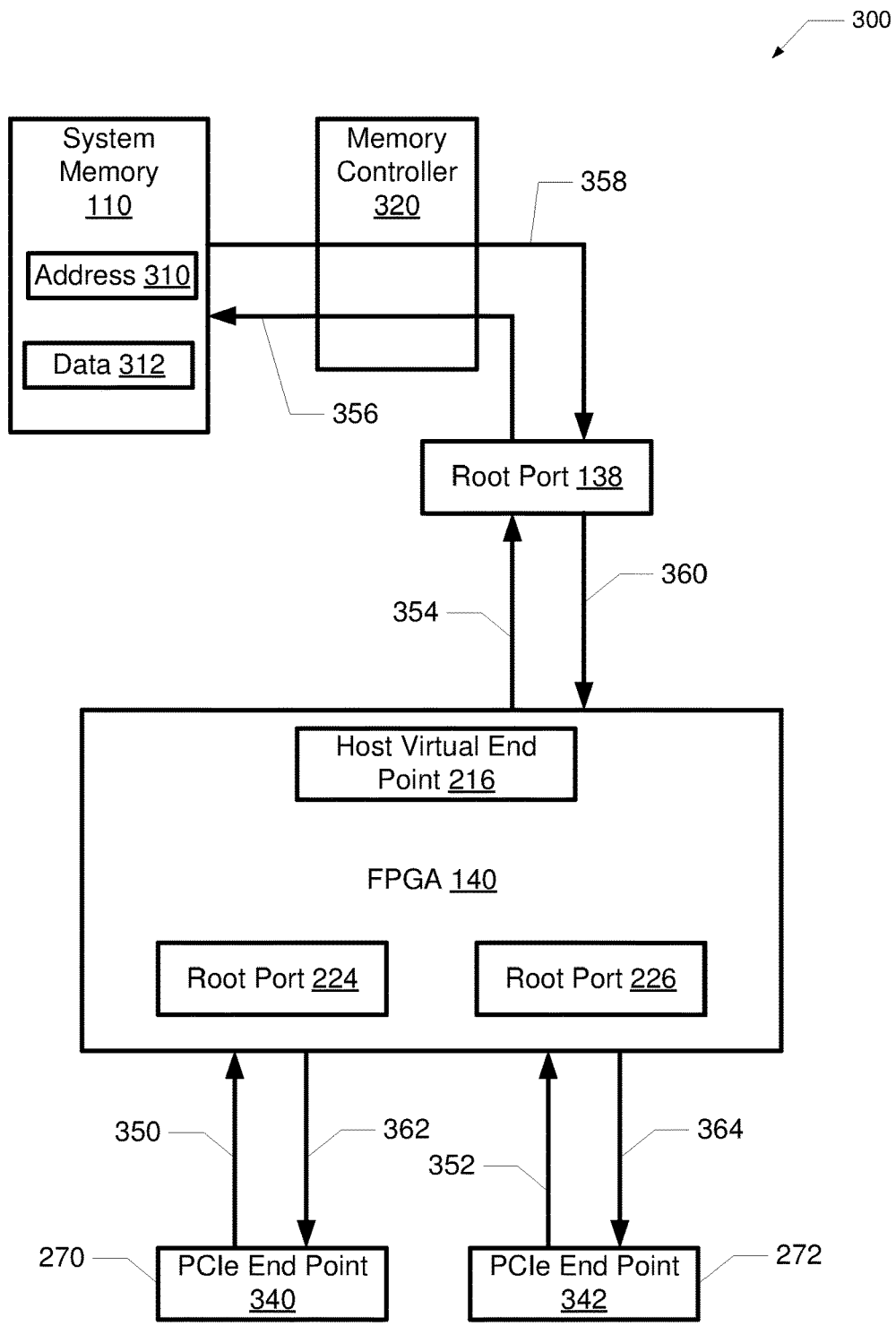
FIG. 3 illustrates a diagrammatic view of an upstream memory read operation from two PCIe endpoints to a host system memory, according to one or more embodiments.

FIG. 3 illustrates an upstream memory read operation 300 issued from two PCIe endpoints 340 and 342 to system memory 110, via FPGA 140. FPGA 140 detects a mastered memory read transaction request 350 in the form of a transaction layer packet (TLP) from PCIe end point 340 of PCIe device 270 to system memory 110. Mastered is defined as the PCIe device is granted bus mastering by setting a "Bus Master Enable" bit in one of the configuration registers. The memory read transaction request 350 includes a system memory address 310. FPGA 140 also detects a mastered memory read transaction request 352 in the form of a transaction layer packet (TLP) from PCIe end point 342 of PCIe device 272 to system memory 110. The memory read transaction request 352 includes system memory address 310. FPGA 140 determines if the system memory addresses of memory read transaction requests 350 and 352 are the same system memory addresses. If the system memory addresses are the same, FPGA 140 coalesces or combines memory read transaction requests 350 and 352 into a common memory transaction request 354 in a common TLP. The TLPs from the upstream requests contain address information in the header of the TLP. Control logic 142 (FIG. 1) of a hardware logic device (for example FPGA 140) stores the first instance of a unique read address, then waits for a match to occur for the same address in the memory read TLP from the 'slower' device, and then the logic coalesces the two into a single upstream common memory read TLP. The common TLP is issued from host virtual end point 216 to root port 138 of root complex device 136 (FIG. 1). The common memory transaction request is routed (356) to system memory 110 via memory controller 320.

Memory controller 320 retrieves the requested data 312 from memory address 310 and sends (358) the data 312 to root port 138. Root port 138 sends at least one common memory response TLP 360 containing data 312 to host virtual end point 216. FPGA 140 generates a first memory read response TLP 362 and a second or duplicate memory read response TLP, 364 each containing requested data 312. FPGA 140 issues the first memory read response TLP 362 to PCIe end point 340 (i.e. PCIe device 270) and issues the second memory read response TLP 364 to PCIe end point 342 (i.e. PCIe device 272). By coalescing or combining the memory read transaction requests 350 and 352 into a common memory transaction request, TLP 354 reduces the number of operations that memory controller 320 has to process and increases bandwidth for data applications that use redundant or duplicate data.

Figure 4:
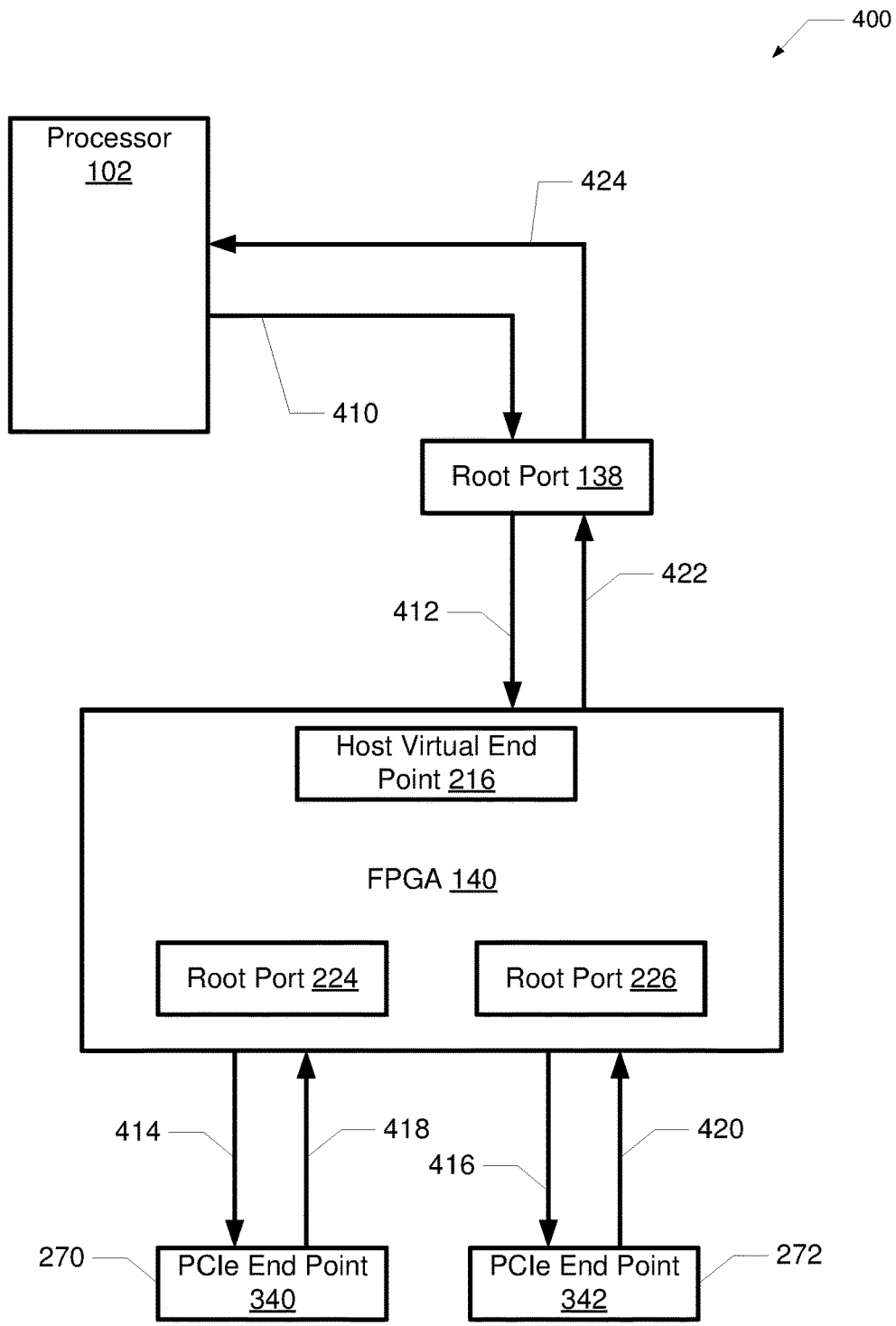
FIG. 4 illustrates a diagrammatic view of a downstream PCIe device read operation from a host to two PCIe endpoints, according to one or more embodiments.

FIG. 4 illustrates a downstream memory read operation 400 from processor 102 to two PCIe endpoints 340 and 342, via FPGA 140. Processor 102 sends a read request 410 for data from a PCIe device (i.e PCIe device 270) to root port 138 of root complex device 136 (FIG. 1). FPGA 140 detects a first PCIe read transaction request, TLP 412, at host virtual end point 216. FPGA 140 generates and issues a second duplicate PCIe read transaction request TLP to a second PCIe device (i.e PCIe device 270). The second PCIe read transaction request TLP is a duplicate of the first PCIe read transaction request. In one embodiment, if one of PCIe devices 270 or 272 is heavily loaded and has limited bandwidth, FPGA 140 can issue a single PCIe read transaction request TLP to one of the two devices based on loading. FPGA 140 issues the first PCIe transaction read request TLP 414 to PCIe end point 340 and issues the second PCIe transaction read request 416 to the second PCIe end point 342.

FPGA 140 receives a first PCIe read response, TLP 418, including data from PCIe end point 340 (i.e. PCIe device 270) and forwards the first PCIe read response TLP (at step 422) to root port 138. First PCIe read response TLP 418 is then forwarded to processor 102 (at step 424). In this example, first PCIe read response TLP 418 from PCIe end point 340 is received before any response is received from PCIe end point 342. At a later time, FPGA 140 receives a second PCIe read response, TLP 420, including data from PCIe end point 342 (i.e. PCIe device 272), and FPGA 140 deletes the later received or second PCIe read response 420. The deletion of the second PCIe read response 420 reduces the number of operations that memory controller 320 (FIG. 3) has to process and increases bandwidth for data applications that use redundant or duplicate data. Because the data contained by first PCIe read response TLP 418 is the same or a duplicate of second PCIe read response TLP 420, the second PCIe read response TLP 420 can be deleted.

Figure 5:
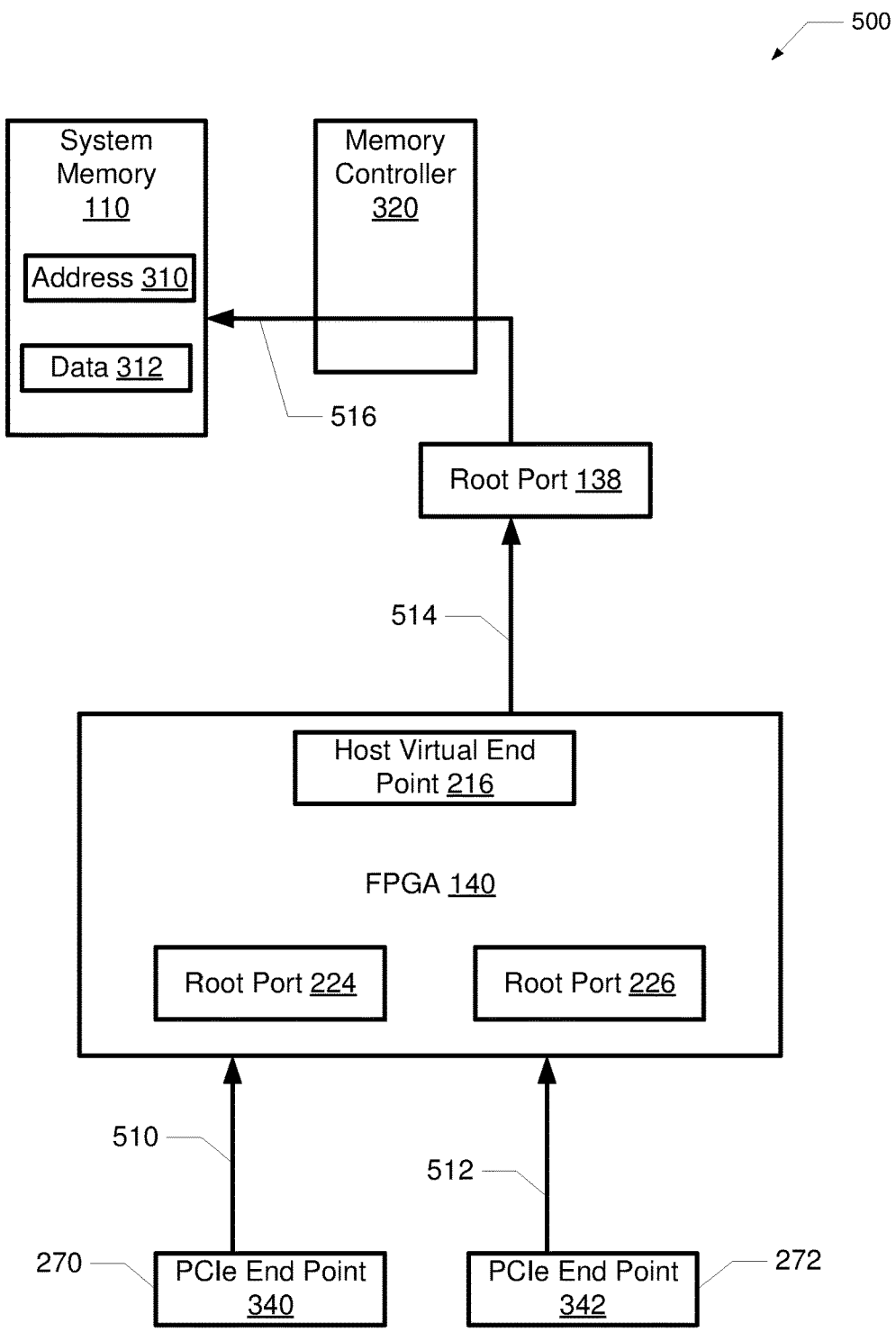
FIG. 5 illustrates a diagrammatic view of an upstream memory write operation from two PCIe endpoints to a host memory, according to one or more embodiments.

FIG. 5 illustrates an upstream memory write operation 500 from two PCIe endpoints 340 and 342 to system memory 110, via FPGA 140. FPGA 140 detects a mastered memory write transaction request 510 in the form of a transaction layer packet (TLP) from PCIe end point 340 of PCIe device 270 to system memory 110. Memory write transaction request TLP 510 includes a system memory address 310. FPGA 140 also detects a mastered memory write transaction request TLP 512 from PCIe end point 342 of PCIe device 272 to system memory 110. Memory write transaction request 512 includes system memory address 310. FPGA 140 determines if the system memory addresses of memory write transaction requests 510 and 512 are the same system memory addresses. If the system memory addresses are the same, FPGA 140 coalesces or combines the memory write transaction requests 510 and 512 into a common memory transaction request 514 in a common TLP that is issued from host virtual end point 216 to root port 138 of root complex device 136 (FIG. 1). The common memory transaction request is routed (516) to system memory 110 via memory controller 320. The memory controller 320 then performs a single memory write operation by writing data 312 to memory address 310 of system memory 110. The use of coalescing or combining the memory write transaction requests 510 and 512 into a common memory transaction request TLP reduces the number of operations that memory controller 320 has to process and increases bandwidth for data applications that use redundant or duplicate data. In one embodiment, memory write transaction requests 510 and 512 can contain data that is not always duplicated or the same. In both situations where memory write transaction requests 510 and 512 contain duplicate and non-duplicate data, FPGA 140 can internally set application specific rules within control logic 142 (FIG. 1) that will decide if the FPGA either (1) waits for both writes to the same location before deciding on the next steps (e.g., coalescing the memory write transaction request or proceeding with a different process) or (2) sends the first received memory write transaction request to a unique write address while discarding the second later received write transaction request to the same address. As examples, the different process referenced in (1) above can include (A) performing a logical operation on both sets of data to determine an outcome, (B) running both sets of data through an algorithm to determine an outcome to be sent, or (C) sending one data set unmodified, but modifying the second data set to be sent after a pre-determined delay. The application or workload specific rules can dictate how the data are processed. The workload specific rules are configurable and can be manipulated by application software running on the processor 102 and/or management CPU 210.

Figure 6:
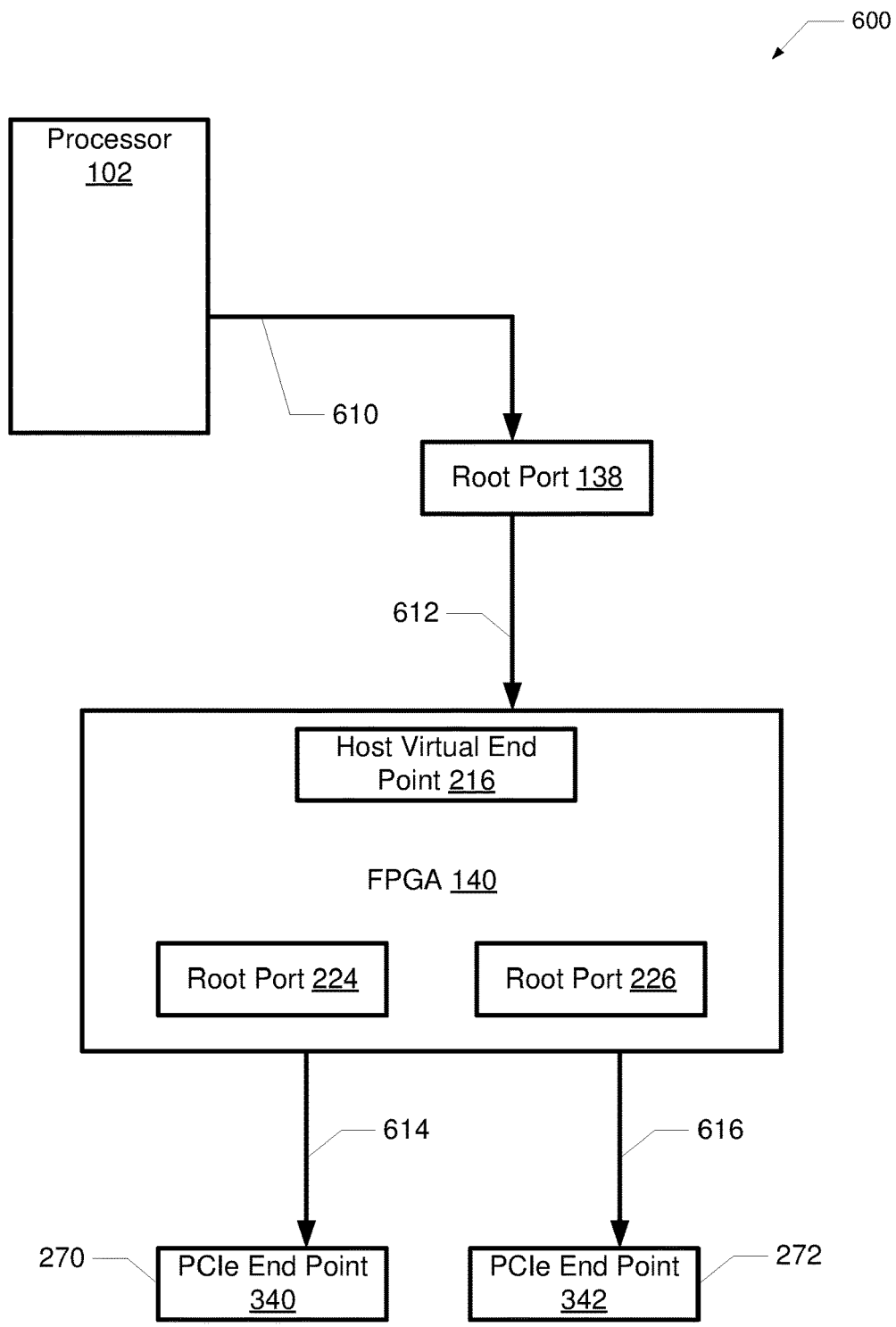
FIG. 6 illustrates a diagrammatic view of a downstream PCIe device write operation from a host to two PCIe endpoints, according to one or more embodiments.

FIG. 6 illustrates a downstream PCIe device write operation 600 that initiates from processor 102 to two PCIe endpoints 340 and 342, via FPGA 140. Processor 102 sends a write request 610 including data to root port 138 of root complex device 136 (FIG. 1). FPGA 140 detects a first PCIe write transaction request TLP 612 at host virtual end point 216 via root port 138. After the first PCIe write transaction request TLP 612 has been detected, FPGA 140 generates a second duplicate PCIe write transaction request TLP. The second PCIe write transaction request TLP is a duplicate or clone of the first PCIe write transaction request TLP. FPGA 140 issues the first PCIe transaction read request TLP 614 from root port 224 to PCIe end point 340 and issues the second PCIe transaction read request TLP 616 from root port 226 to PCIe end point 342. The duplication of the PCIe transaction read request TLP reduces the number of operations that memory controller 320 has to generate towards downstream devices and increases effective bandwidth between root complex 136 and x8 end point 216.

The IHS 100, and specifically FPGA 140 and control logic 142, reduces the number of memory transaction requests (both read and write) that memory controller 320 has to process and increases bandwidth for data applications that use redundant or duplicate data such as NVMe solid state drives used in RAID configurations.

Those of ordinary skill in the art will appreciate that the hardware and software/firmware components and basic configuration depicted in FIGS. 1-6 and described herein may vary. For example, the illustrative components within IHS 100 (FIG. 1) are not intended to be exhaustive, but rather are representative to highlight components that can be utilized to implement aspects of the present disclosure. For example, other devices/components may be used in addition to or in place of the hardware depicted. The depicted example does not convey or imply any architectural or other limitations with respect to the presently described embodiments and/or the general disclosure.

FIGS. 7-10 illustrate flowcharts of exemplary methods 700, 800, 900 and 1000 by which FPGA 140 within the preceding figures performs different aspects of the processes that enable the one or more embodiments of the disclosure. Generally, method 700 represents a method for performing an upstream memory read issued from two PCIe endpoints to a system memory in an IHS. Method 800 represents a method for performing a downstream PCIe device read issued from a processor to two PCIe endpoints in an IHS. Method 900 represents a method for performing an upstream memory write issued from two PCIe endpoints to a system memory in an IHS. Method 1000 represents a method for performing a downstream PCIe device write issued from a processor to two PCIe endpoints in an IHS.

The description of methods 700, 800, 900 and 1000 is provided with general reference to the specific components illustrated within the preceding FIGS. 1-6. Generally methods 700, 800, 900 and 1000 are described as being implemented via FPGA 140 and particularly by control logic 142. It is however appreciated that certain aspects of the described methods may be implemented via other processing devices and/or execution of other code.

Figure 7:
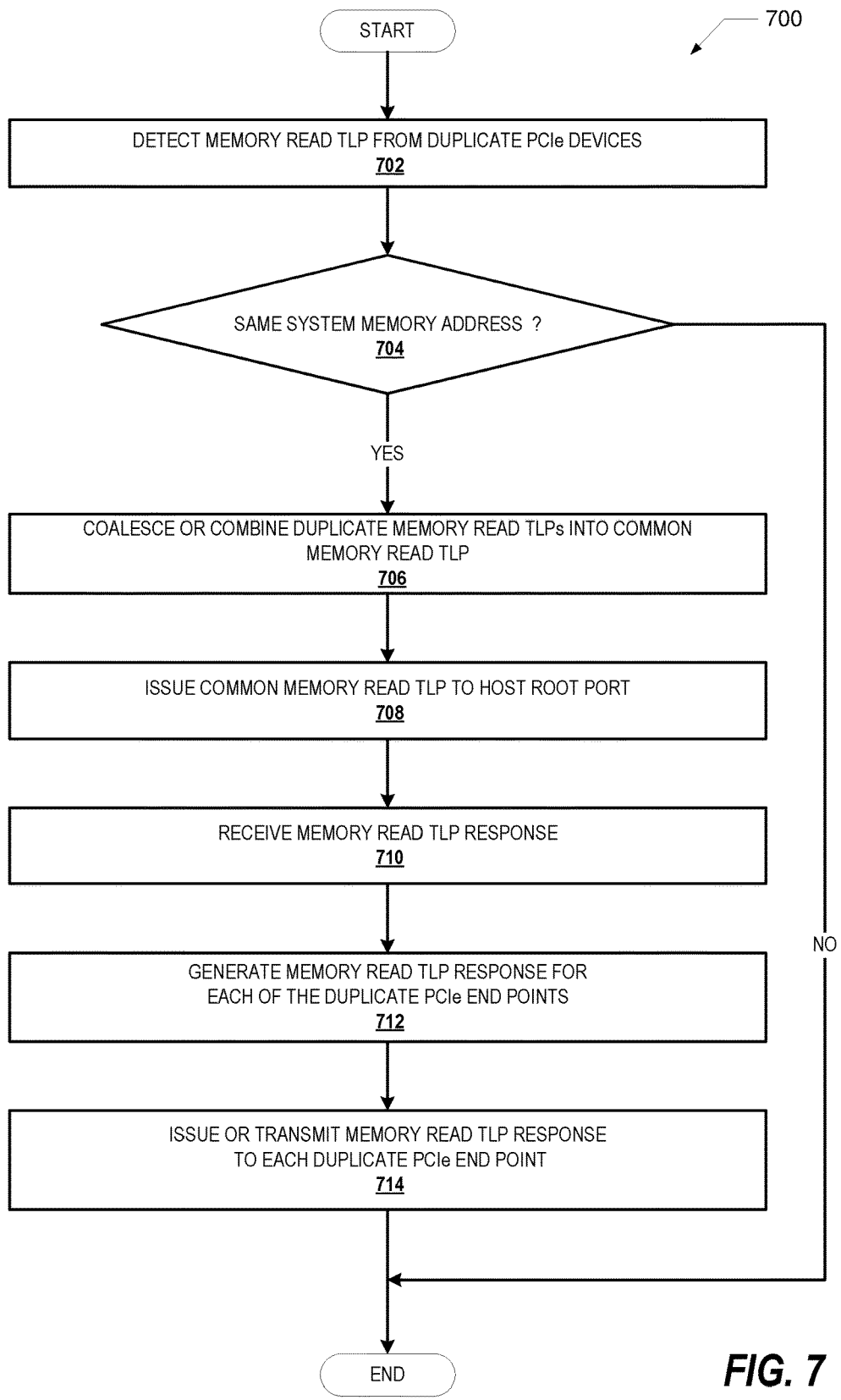
FIG. 7 is a flow chart illustrating one example of a method for performing an upstream memory read operation from two PCIe endpoints to a host system memory in an information handling system.

Referring now to the flow chart of FIG. 7, method 700 begins at the start block and proceeds to block 702 where FPGA 140 detects a mastered memory read transaction request 350 in the form of a first TLP issued from PCIe end point 340 of PCIe device 270 to system memory 110. Memory read transaction request 350 includes a system memory address 310. FPGA 140 also detects a mastered memory read transaction request 352 in the form of a second TLP issued from PCIe end point 342 of PCIe device 272 to system memory 110. The memory read transaction request 352 includes system memory address 310. At decision block 704, FPGA 140 determines if the system memory addresses of memory read transaction requests 350 and 352 are the same system memory addresses. If the system memory addresses are not the same, method 700 ends. If the system memory addresses are the same, FPGA 140 coalesces or combines memory read transaction requests 350 and 352 into a common memory transaction request TLP 354 (block 706) and issues the common memory transaction request TLP 354 from host virtual end point 216 to root port 138 of root complex device 136 (block 708). The common memory transaction request is routed to system memory 110 via memory controller 320.

The memory controller 320 retrieves the requested data 312 from memory address 310 and sends data 312 to root port 138. FPGA 140 receives the common memory response TLP 360 containing data 312 at the host virtual end point 216 (block 710). FPGA 140 generates a first memory read response TLP and a second or duplicate memory read response TLP, each containing data 312 (block 712). FPGA 140 issues the first memory read response TLP 362 to PCIe end point 340 (i.e. PCIe device 270) and issues the second memory read response TLP 364 to PCIe end point 342 (i.e. PCIe device 272) (block 714). Method 700 then terminates. The use of coalescing or combining the memory read transaction requests 350 and 352 into a common memory transaction request TLP reduces the number of operations that memory controller 320 has to process and increases bandwidth across the root port to FPGA virtual endpoint interface.

Figure 8:
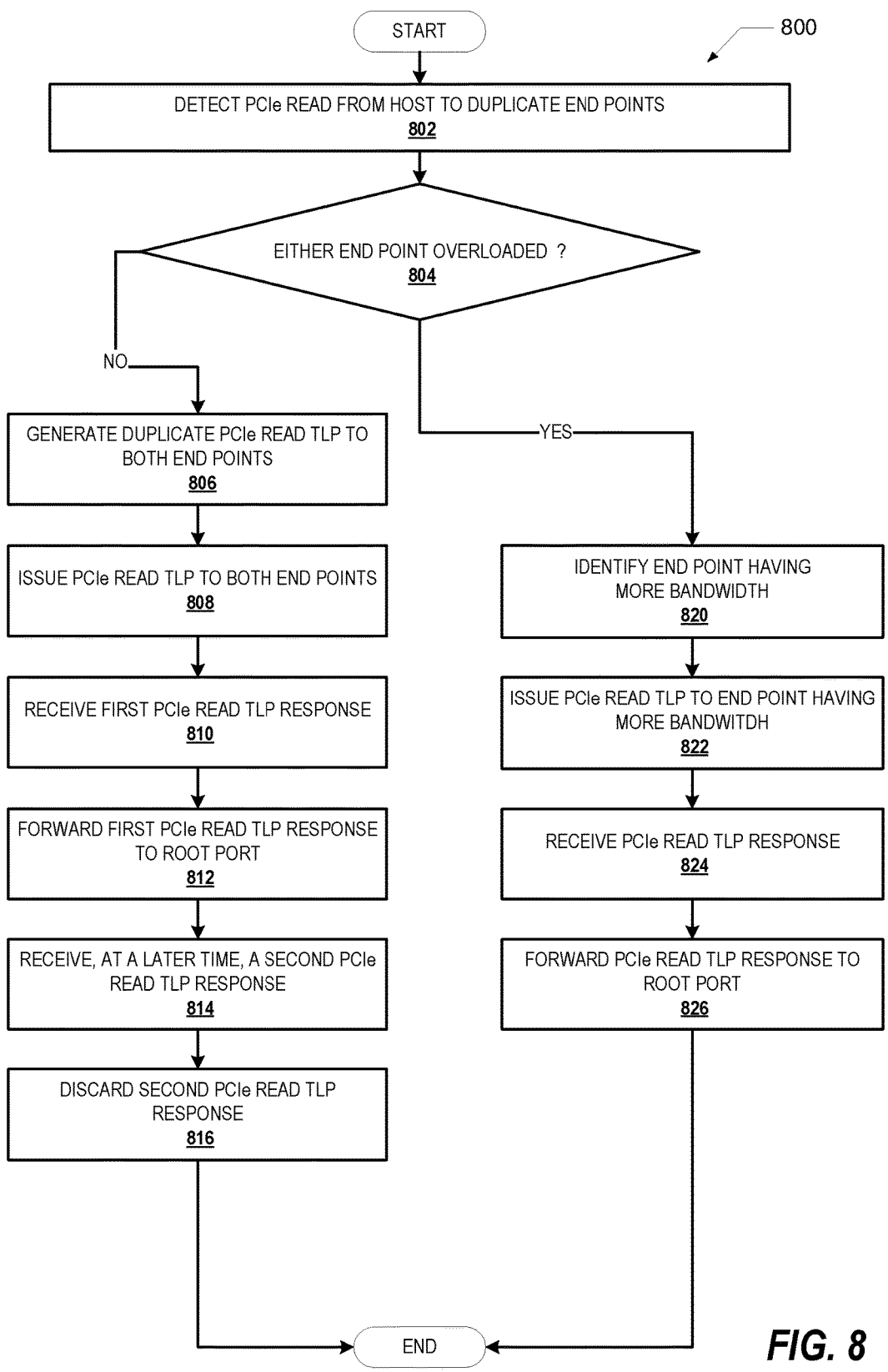
FIG. 8 is a flow chart illustrating one example of a method for performing a downstream PCIe device read operation from a host to two PCIe endpoints in an information handling system.

With reference to the flow chart of FIG. 8, method 800 begins at the start block and proceeds to block 802 where FPGA 140 detects a first PCIe read transaction request TLP 412 at host virtual end point 216. Processor 102 sends a read request 410 for data, from a PCIe device (i.e PCIe device 270), to the host virtual end point 216 via root port 138. At decision block 804, FPGA 140 detects the read request and determines if any of PCIe devices 270 or 272 are heavily loaded and/or have limited bandwidth. In response to none of PCIe devices 270 or 272 being heavily loaded, FPGA 140 generates and forwards a second duplicate PCIe read transaction request TLP to a second PCIe device (e.g., PCIe device 272) (block 806). Processor 102 requests the same (i.e. duplicate) data from PCIe devices 270 and 272. FPGA 140 issues the first PCIe transaction read request TLP 414 to PCIe end point 340 and issues the second PCIe transaction read request 416 to the second PCIe end point 342 (block 808).

Duplication of the read request 410 is performed in hierarchies where the same data resides on two different PCIe devices. With these hierarchies, duplicating the read transaction request TLP to both PCIe devices ensures that the fastest possible response will occur from at least one of the PCIe devices. The duplication of the request is especially applicable if one PCIe device is temporarily unavailable or is possibly running in a deprecated mode that is unknown to the host. In one embodiment, a duplicate of the read transaction request TLP can be generated in order to compare data from each of the PCIe devices. In another embodiment, the duplicate is generated to perform an algorithmic operation on the data from both of the PCIe devices before responding to the host. In another embodiment, particularly where these is no sharing of the same data on two PCIe devices, a second duplicate PCIe read transaction request is not always generated. FPGA 140 receives a first in time PCIe read response TLP (assume here that first PCIe read response TLP 418 is received first in time) including data 271 from PCIe end point 340 (i.e. PCIe device 270) (block 810). FPGA 140 forwards the first PCIe read response TLP to root port 138, which is then forwarded to processor 102 (block 812). In this example, first PCIe read response TLP 418 from PCIe end point 340 is received before any response is received from PCIe end point 342. Assuming that the read request was also transmitted to PCIe end point 342, then at a later time, FPGA 140 receives a second PCIe read response TLP 420 including data 273 from the PCIe end point 342 (i.e. PCIe device 272) (block 814). Data 271 and 273 are the same redundant data. At block 816, FPGA 140 discards or deletes the later received or second PCIe read response 420. The discarding of the second PCIe read response 420 reduces the number of operations that memory controller 320 has to process thereby increasing bandwidth for data applications that use redundant or duplicate data. The discarding of the second PCIe read response 420 also reduces the bandwidth used across the root port to PCIe endpoint interface. The reduction of bandwidth usage across the root port to PCIe endpoint interface occurs for embodiments that involve coalescing either an upstream write/read from both devices or the single downstream read/write issued by the host due to intelligent replication in the FPGA 140. Because the data contained by first PCIe read response TLP 418 is the same or a duplicate of second PCIe read response TLP 420, the second PCIe read response TLP 420 can be discarded. Method 800 then ends.

In response to one or both of the PCIe devices 270 or 272 being heavily loaded at decision block 806, FPGA 140 identifies the endpoint having more bandwidth (block 820) and issues the PCIe transaction read request TLP (i.e 414 or 416) to the PCIe end point having more bandwidth (block 822). FPGA 140 receives a PCIe read response TLP, including data from the PCIe end point having more bandwidth (block 824). FPGA 140 forwards the PCIe read response TLP to root port 138, which then forwards the PCIe read response TLP to processor 102 (block 826). Method 800 then terminates.

Figure 9:
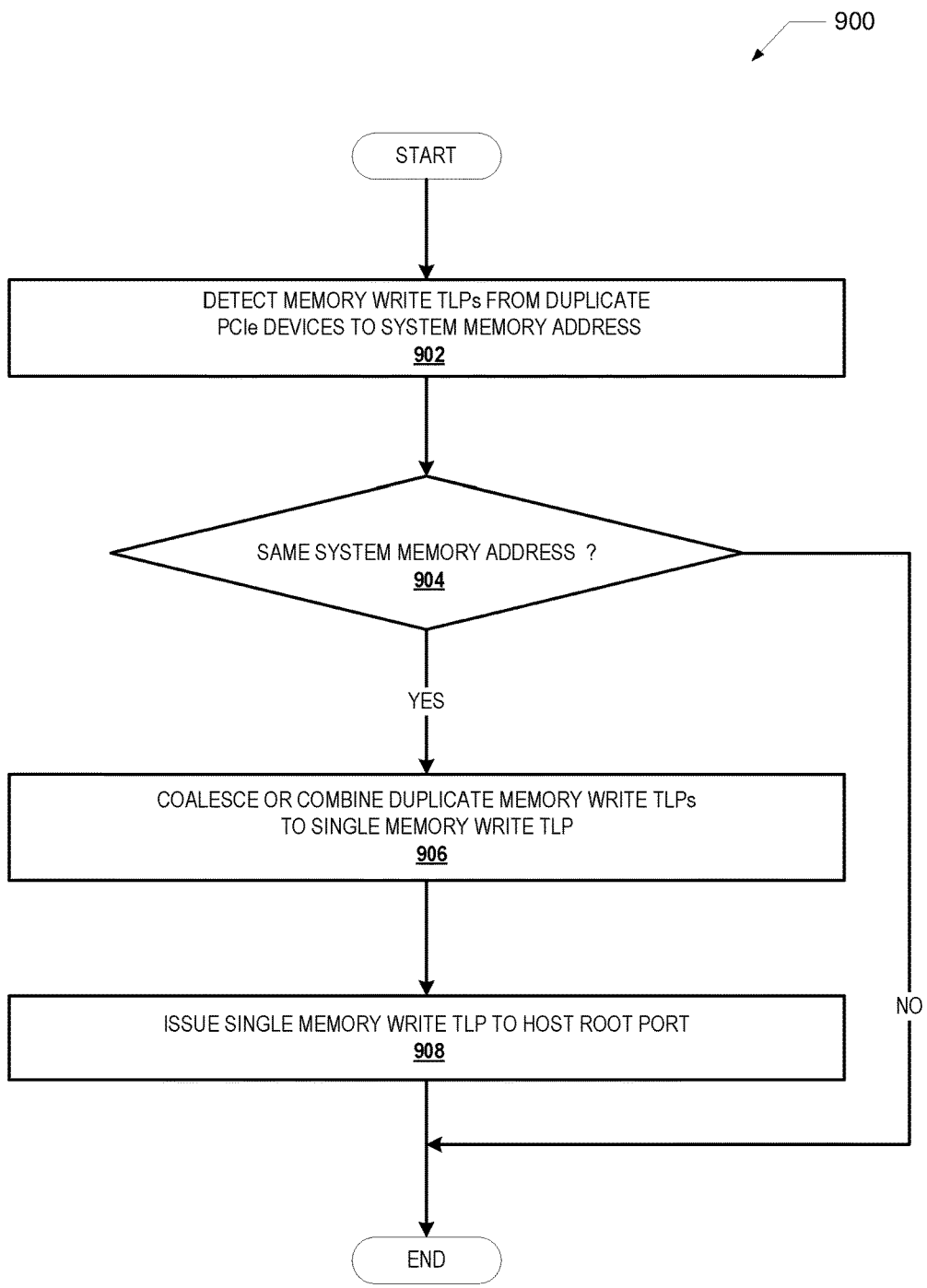
FIG. 9 is a flow chart illustrating one example of a method for performing an upstream memory write from two PCIe endpoints to a host memory in an information handling system.

Turning to FIG. 9, method 900 begins at the start block and proceeds to block 902 where FPGA 140 detects a mastered memory write transaction request 510 in the form of a TLP from PCIe end point 340 of PCIe device 270 to system memory 110. TLP 510 includes data 271. The memory write transaction request 350 includes a system memory address 310. FPGA 140 also detects at block 902 a mastered memory write transaction request TLP 512 from PCIe end point 342 of PCIe device 272 to system memory 110. The memory write transaction request 352 includes system memory address 310. TLP 512 includes data 273.

As previously introduced, FPGA 140 can internally set application specific rules within control logic 142 that will decide if the FPGA either (1) waits for both writes to the same location before deciding on the next steps, such as coalescing the memory write transaction request or (2) sends the first received memory write transaction request to a unique write address, while discarding the second later received write transaction request to the same address. At decision block 904, FPGA 140 determines if the system memory addresses of memory write transaction requests 510 and 512 are the same system memory addresses. If the system memory addresses are not the same, method 900 terminates. If the system memory addresses are the same, FPGA 140 coalesces or combines the memory write transaction requests 510 and 512 into a common memory transaction request 514 in a common TLP with one of data 271 or 273 (block 906) and issues the common memory transaction request TLP from host virtual end point 216 to root port 138 of root complex device 136 (block 908). Method 900 then ends. The common memory transaction request is routed (516) to system memory 110 via memory controller 320. The memory controller 320 then performs a single memory write operation by writing one of data 271 or 273 to data 312 with a memory address 310 of system memory 110. The use of coalescing or combining the memory write transaction requests 510 and 512 into a common memory transaction request TLP reduces the number of operations that memory controller 320 has to process and increases bandwidth across the root port to FPGA virtual endpoint interface.

Figure 10:
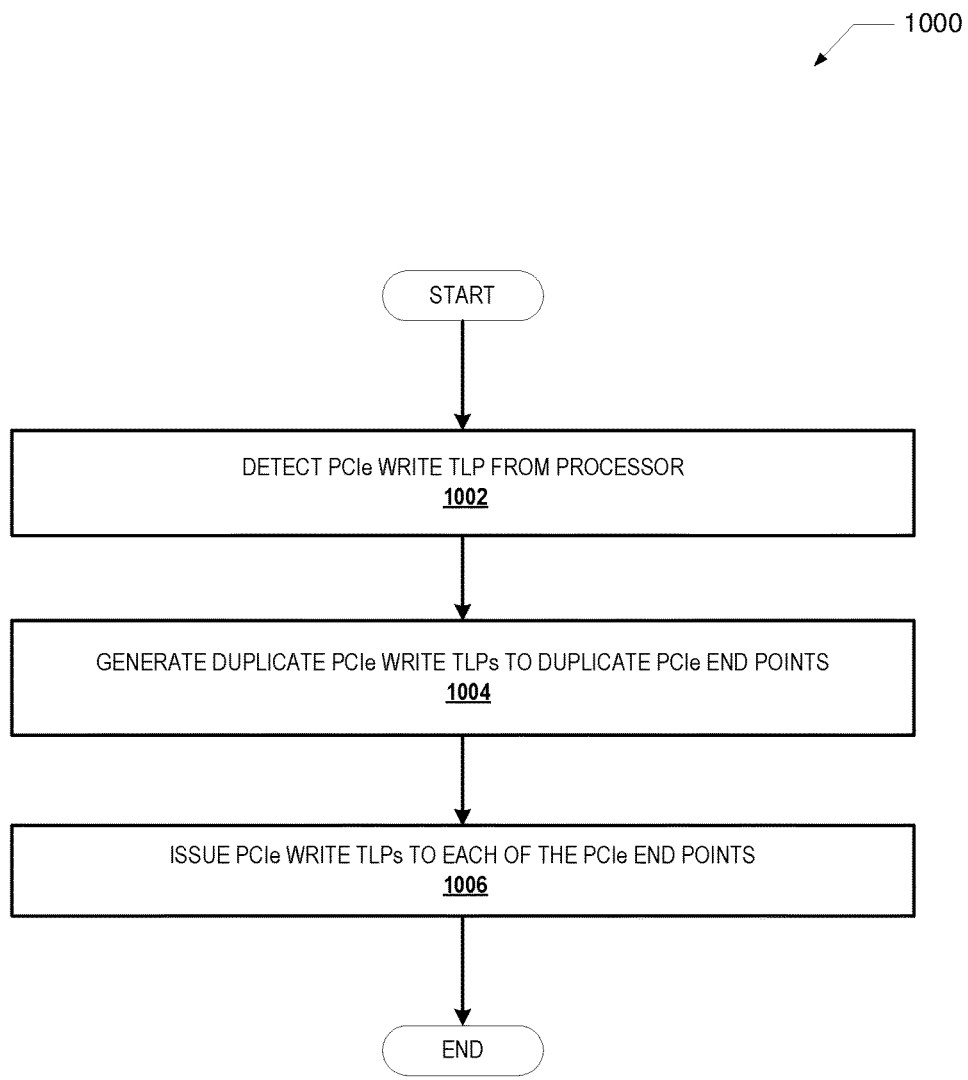
FIG. 10 is a flow chart illustrating one example of a method for performing a downstream PCIe device write from a host to two PCIe endpoints in an information handling system.

Referring now to the flow chart of FIG. 10, method 1000 begins at the start block and proceeds to block 1002 where FPGA 140 detects a first PCIe write transaction request TLP 612 at host virtual end point 216. Processor 102 sends a write request 610 including data 312 to root port 138 of root complex device 136. The write request 610 is then transmitted to the host virtual end point 216. After receiving the first PCIe write transaction request TLP 612, FPGA 140 generates a second duplicate PCIe write transaction request TLP including duplicated data 312 (block 1004). The second PCIe write transaction request TLP is a duplicate of the first PCIe write transaction request TLP. FPGA 140 issues the first PCIe transaction write request TLP 614 from root port 224 to PCIe end point 340 and issues the second PCIe transaction write request TLP 616 from root port 226 to PCIe end point 342 (block 1006). Method 1000 then ends. The duplication of the PCIe transaction write request TLP reduces the number of operations that memory controller 320 has to process and increases bandwidth for data applications that use redundant or duplicate data.

In the above described flow chart, one or more of the methods may be embodied in a computer readable medium containing computer readable code such that a series of functional processes are performed when the computer readable code is executed on a computing device. In some implementations, certain steps of the methods are combined, performed simultaneously or in a different order, or perhaps omitted, without deviating from the scope of the disclosure. Thus, while the method blocks are described and illustrated in a particular sequence, use of a specific sequence of functional processes represented by the blocks is not meant to imply any limitations on the disclosure. Changes may be made with regards to the sequence of processes without departing from the scope of the present disclosure. Use of a particular sequence is therefore, not to be taken in a limiting sense, and the scope of the present disclosure is defined only by the appended claims.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. Computer program code for carrying out operations for aspects of the present disclosure may be written in any combination of one or more programming languages, including an object oriented programming language, without limitation. These computer program instructions may be provided to a processor of a general purpose computer, special purpose computer, such as a service processor, or other programmable data processing apparatus to produce a machine, such that the instructions, which execute via the processor of the computer or other programmable data processing apparatus, performs the method for implementing the functions/acts specified in the flowchart and/or block diagram block or blocks.

One or more of the embodiments of the disclosure described can be implementable, at least in part, using a software-controlled programmable processing device, such as a microprocessor, digital signal processor or other processing device, data processing apparatus or system. Thus, it is appreciated that a computer program for configuring a programmable device, apparatus or system to implement the foregoing described methods is envisaged as an aspect of the present disclosure. The computer program may be embodied as source code or undergo compilation for implementation on a processing device, apparatus, or system. Suitably, the computer program is stored on a carrier device in machine or device readable form, for example in solid-state memory, magnetic memory such as disk or tape, optically or magneto-optically readable memory such as compact disk or digital versatile disk, flash memory, etc. The processing device, apparatus or system utilizes the program or a part thereof to configure the processing device, apparatus, or system for operation.

As will be further appreciated, the processes in embodiments of the present disclosure may be implemented using any combination of software, firmware or hardware. Accordingly, aspects of the present disclosure may take the form of an entirely hardware embodiment or an embodiment combining software (including firmware, resident software, micro-code, etc.) and hardware aspects that may all generally be referred to herein as a "circuit," "module," or "system." Furthermore, aspects of the present disclosure may take the form of a computer program product embodied in one or more computer readable storage device(s) having computer readable program code embodied thereon. Any combination of one or more computer readable storage device(s) may be utilized. The computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage device may be any tangible medium that can contain, or store a program for use by or in connection with an instruction execution system, apparatus, or device.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. A method of transmitting data in an information handling system (IHS) configured with a plurality of a peripheral component interconnect express (PCIe) devices, the method comprising:
   detecting, via a hardware logic device, a first mastered memory transaction request from a first PCIe device to a system memory, the first mastered memory transaction request including a first system memory address;
   detecting a second mastered memory transaction request from a second PCIe device to the system memory, the second mastered memory transaction request including a second system memory address;
   wherein the first and second mastered memory transaction requests comprise transaction layer packets (TLPs) that are detected at root ports of the hardware logic device;
   determining if the first system memory address and the second system memory address are the same system memory address;
   in response to the first system memory address and the second system memory address being the same system memory address, coalescing the first memory transaction request and the second memory transaction request into a common memory transaction request; and
   issuing the common memory transaction request to the system memory.

2. The method of claim 1, wherein the first and second memory transaction requests are memory write requests.

3. The method of claim 1, wherein the first and second memory transaction requests are memory read requests.

4. The method of claim 3, further comprising:
   receiving, via a root port of a root complex device communicatively coupled between the system memory and the hardware logic device, a common memory read response from the system memory, the common memory read response including third data;
   generating a first memory read response including the third data and a second memory read response including the third data;
   issuing the first memory read response including the third data to the first PCIe device; and
   issuing the second memory read response including the third data to the second PCIe device.

5. The method of claim 1, wherein the common memory transaction request comprises a common TLP that is issued to a host virtual end point of the hardware logic device.

6. An information handling system (IHS) comprising:
   a processor communicatively coupled to a system memory;
   a first peripheral component interconnect express (PCIe) device;
   a second PCIe device that includes duplicate data of the first PCIe device; and a hardware logic device communicatively coupled to the processor and to each of the first PCIe device and the second PCIe device, the hardware logic device having control logic that facilitates data transmission, wherein the control logic causes the hardware logic device to:
detect a first mastered memory transaction request from the first PCIe device to the system memory, the first mastered memory transaction request including a first system memory address;
detect a second mastered memory transaction request from the second PCIe device to the system memory, the second mastered memory transaction request including a second system memory address;
wherein the hardware logic device comprises a root port serving each PCIe device, and the first and second mastered memory transaction requests comprise transaction layer packets (TLPs) that are detected at respective root ports of the FPGA;
determine if the first system memory address and the second system memory address are the same system memory address;
in response to the first system memory address and the second system memory address being the same system memory address, coalesce the first memory transaction request and the second memory transaction request into a common memory transaction request; and
issue the common memory transaction request to the system memory.

7. The information handling system of claim 6, wherein the first and second memory transaction requests are memory write requests.

8. The information handling system of claim 6, wherein the first and second memory transaction requests are memory read requests.

9. The information handling system of claim 8, wherein the control logic further causes the hardware logic device to:
receive a common memory read response from the system memory, the common memory read response including third data;
generate a first memory read response including third data and a second memory read response including third data;
issue the first memory read response including third data to the first PCIe device; and
issue the second memory read response including third data to the second PCIe device.

10. The information handling system of claim 6, the common memory transaction request comprises a common TLP that is issued to a host virtual end point of the hardware logic device.

11. A method of transmitting data in an information handling system (IHS) configured with a plurality of a peripheral component interconnect express (PCIe) devices, the method comprising:
detecting, via a hardware logic device, a first PCIe transaction request issued from the IHS to a first PCIe device;
in response to detecting the first PCIe transaction request, generating, via the hardware logic device, a second PCIe transaction request for a second PCIe device, the second PCIe transaction request being a duplicate of the first PCIe transaction request;
issuing the first PCIe transaction request to the first PCIe device; and
issuing the second PCIe transaction request to the second PCIe device.

12. The method of claim 11, wherein the first and second PCIe transaction requests are PCIe read requests and the first and second PCIe transaction requests are requesting the same data, and the method further comprises:
identifying whether one of the first PCIe device and the second PCIe device has limited bandwidth; and
in response to identifying that a first one of the first and the second PCIe device has limited bandwidth, issue a single PCIe read operation to a next one of the first and the second PCIe device that is not as heavily loaded.

13. The method of claim 11, wherein the first and second PCIe transaction requests are PCIe write requests.

14. The method of claim 11, further comprising:
determining if a first end point of the first PCIe device has sufficient bandwidth to process the first PCIe transaction request;
determining if a second end point of the second PCIe device has sufficient bandwidth to process the second PCIe transaction request;
in response to determining that any one of the first and the second end points does not have sufficient bandwidth to process the first and second PCIe transaction requests, identifying one of the first and second end points having more bandwidth as an issuing end point; and
issuing a corresponding one of the first or the second PCIe transaction requests via the issuing end point.

15. The method of claim 11, further comprising:
receiving, at a first time, a first PCIe read response from the first PCIe device;
receiving, at a second later time, a second PCIe read response from the second PCIe device;
forwarding the first PCIe read response to a host root port; and
discarding the second PCIe read response.

16. An information handling system (IHS) comprising:
a processor communicatively coupled to a system memory;
a hardware logic device communicatively coupled to the processor;
a first peripheral component interconnect express (PCIe) device communicatively coupled to the hardware logic device; and
a second PCIe device communicatively coupled to the hardware logic device;
wherein the hardware logic device includes control logic thereon that causes the hardware logic device to:
detect a first PCIe transaction request issued from the IHS to a first PCIe device;
in response to detecting the first PCIe transaction request, generate a second PCIe transaction request for a second PCIe device, the second PCIe transaction request being a duplicate of the first PCIe transaction request;
issue at least one single PCIe transaction request from among the first PCIe transaction request to the first PCIe device and the second PCIe transaction request to the second PCIe device, based on loading.

17. The information handling system of claim 16, wherein the first and second PCIe transaction requests are PCIe read requests.

18. The information handling system of claim 16, wherein the first and second PCIe transaction requests are PCIe write requests.

19. The information handling system of claim 16, wherein the control logic further causes the hardware logic device to:

determine if a first end point of the first PCIe device has sufficient bandwidth to process the first and PCIe transaction request;

determine if a second end point of the second PCIe device has sufficient bandwidth to process the second PCIe transaction request;

in response to determining that any of the first and the second end points do not have sufficient bandwidth to process the first and second PCIe transaction requests, identify one of the first or second end points having more bandwidth as the issuing end point; and issue a corresponding one of the first or the second PCIe transaction requests via the issuing end point.

20. The information handling system of claim 16, wherein the control logic further causes the hardware logic device to:

receive, at a first time, a first PCIe read response from the first PCIe device;

forward the first PCIe read response to a host root port;

receive, at a second later time, a second PCIe read response from the second PCIe device; and delete the second PCIe read response.

* * * * *